United States Patent [19]

Ogata et al.

[11] Patent Number: 4,677,606

[45] Date of Patent: Jun. 30, 1987

[54] DATA RECORDING AND REPRODUCING METHOD

[75] Inventors: Mikito Ogata; Masahito Mori, both of Odawara; Takashi Doi, Hadano; Michio Miyazaki, Odawara, all of Japan

[73] Assignee: Hitachi, Ltd., Tokyo, Japan

[21] Appl. No.: 641,176

[22] Filed: Aug. 15, 1984

[30] Foreign Application Priority Data

Aug. 29, 1983 [JP] Japan ................................ 58-156235

[51] Int. Cl.$^4$ .......................... G11B 15/52; H04N 5/76
[52] U.S. Cl. .......................................... 369/59; 369/48
[58] Field of Search ................ 369/47, 48, 59; 360/60

[56] References Cited

U.S. PATENT DOCUMENTS 4,308,612 12/1981 Miyauchi et al. ...................... 369/48
4,433,403 2/1984 Baba et al. ............................. 369/48

Primary Examiner—Vincent P. Canney
Attorney, Agent, or Firm—Antonelli, Terry & Wands

[57] ABSTRACT

A data recording/reproducing method for a non-rewritable recording medium of a rotating type, each of tracks on the recording medium is divided into a plurality of blocks which are allotted with respective addresses. Each block includes a data recording area and a deletion flag area which is divided into a plurality of sub-areas. One of the sub-areas in a given block is associated with other block which is in a predetermined address relation with the given block. When the content in the data recording area of one block on the recording medium is to be rendered invalid, deletion flag information is also recorded in the sub-area of the other block having the predetermined address relation with the one block. Upon reading, the data of the blocks read out from the recording medium exclusive of the data of the block determined to be invalid on the basis of the flag information is transferred to a high-rank system.

10 Claims, 6 Drawing Figures

DATA RECORDING AND REPRODUCING METHOD

BACKGROUND OF THE INVENTION

1. Field of the Invention

The present invention in general relates to a method of recording and reproducing data. More particularly, the invention concerns a data recording/reproducing method suited for a non-rewritable storage device of the rotation type which is used as an external memory or storage equipment of a computer system and which includes a plurality of tracks.

2. Description of the Prior Art

Heretofore, in the data recording apparatus which constitutes a part of a computer system, there has been no need for recording information indicative of logical erasure or deletion of recorded data on a recording medium at all, because rewritable recording media or easily exchangeable recording media have been employed in all kinds of the conventional recording apparatus.

In reality, when a particular set of recorded data on a rewritable recording medium such as a magnetic disc is to be erased, it is sufficient to delete simply the data set itself or a part of the indexes designating the data set of concern or to write other data at the relevant location. In the case of non-rewritable recording medium of small capacity such as PROM, deletion of data can be readildy accomplished by exchanging the PROM containing the data to be deleted by another PROM loaded with fresh data.

In contrast, in the case of an optical disc utilized as a recording medium of large capacity, it is impossible to accomplish the deletion or rewriting of data once recorded on the recording medium in the manner similar to the data deletion in the magnetic disc and others, because recording of data or information on the optical disc is carried out by forming small holes termed pits in a metallic film deposited over the disc surface through irradiation with a light beam.

SUMMARY OF THE INVENTION

It is an object of the present invention to provide a data recording/reproducing method for a data recording/reproducing system which employs a non-rewritable recording medium such as an optical disc incapable of rewriting data, which method allows a recorded data block to be logically erased or deleted so that the data block logically deleted is prevented from being transferred to a host or high-rank system after the deletion.

Another object of the present invention is to provide a data recording/reproducing method for a data recording apparatus which unreliable with regard to the data writing or reading on or from a recording medium, which method is capable of distinctly determining with an improved reliability whether a block having data recorded is logically deleted or not.

In view of the above and other objects, there is provided according to an aspect of the invention, a data recording and reproducing method for a data recording/reproducing system in which a rotation type recording medium having a plurality of tracks, each of which is divided into a plurality of blocks is used, the blocks being allotted with respective addresses. According to the data recording/reproducing method of the invention, each of the blocks comprises the data area for recording data and a flag area for recording deletion flag information indicating invalidity of the data of one block. When a deletion command for a particular one of the blocks is issued by a host or high-rank system, a deletion flag is written in the flag area associated with that particular block. Upon data reading, the data of the block associated with the deletion flag is excluded from the data transfer to the high-rank system by checking the deletion flag areas of a series of blocks read out from the recording medium.

According to a preferred embodiment of the invention, each flag area is divided into a plurality of sub-areas. A first one of the sub-areas is used for recording a first deletion flag indicating deletion of data of the block in which that sub-area is present, while a second one of the sub-areas is used for recording a second deletion flag indicating deletion of data of an other block which is in a predetermined address relation with the first mentioned block. When a command for deleting data of a block on the recording medium is issued by the high-rank system, the first deletion flag is set at the flag area of that block, and additionally the second deletion flag is set at the flag area of the other block which is in the predetermined relation with the first mentioned block.

Since the flag information indicating invalidity of one block is also recorded in the flag area of the other block, the flag information indicating a same item i.e. deletion of the data block, can be arrayed at plural dispersed locations on the recording medium. This means that even when writing or reading of a given flag information is accompanied with error, it is possible to refer to other corresponding flag information in at least one other block to check the flag information of the one block, whereby the reliability of the flag information is remarkably enhanced.

By dividing the flag area into three or more sub-areas and using a plurality of the second flags, validness or invalidity of a particular block can be determined through decision by a majority of the flag information read out from three or more blocks on the recording block. According to this method, the probability that the data which should have been deleted might be sent to the high-rank system due to an error involved in writing or reading the flag information can be significantly decreased, whereby the reliability of the recorded data can be correspondingly increased.

The above and other related objects, features and advantages of the invention will be apparent from the following description taken in conjunction with the accompanying drawings.

DESCRIPTION OF THE PREFERRED EMBODIMENTS

Figure 1:
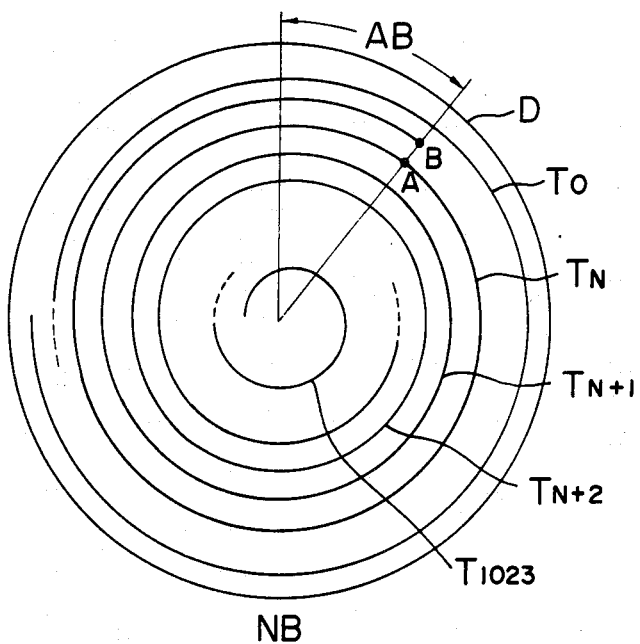
FIG. 1 is a view showing an optical disc having a plurality of tracks.

In the following, the present invention will be described by referring to the drawings.

FIG. 1 shows a track pattern or format provided on an optical disc for an optical disc storage equipment. The tracks are formed on the disc D in a spiral or helicoidal pattern, wherein the outermost track or turn is designated by $T_0$ (track 0), the second outer track is designated by $T_1$ (track 1), . . . and so on up to the innermost track turn designated by $T_{1023}$ (track 1023). Referring to FIG. 1, the track N or $T_N$ in general designates that portion of the spiral path which extends from a point A to a point B.

Figure 2:
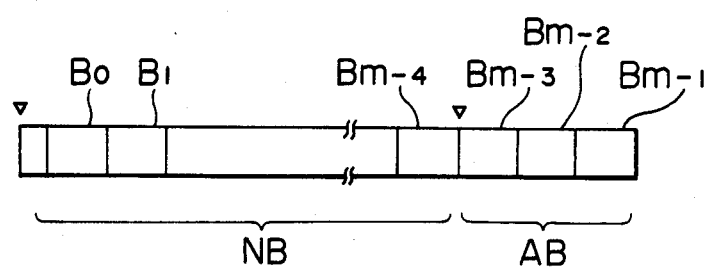
FIG. 2 is a view illustrating division of a track into a plurality of blocks.

Each of the tracks mentioned above is divided into a plurality of areas referred to as blocks or sectors in a manner illustrated in FIG. 2. For convenience of description, the individual blocks are referred to, starting from the leading one, as the block 0 ($B_0$), the block 1 ($B_1$) and so on down to the block $m-1(B_{m-1})$, wherein the region designated by a symbol NB and consisting of the blocks $B_0$ to $B_{m-4}$ is destined to be used for ordinary data recording, while the last three blocks $B_{m-3}$, $B_{m-2}$ and $B_{m-1}$ included in a region designated by a symbol AB are referred to as the alternative blocks and destined to be used upon occurrence of fault in the data writing at the blocks NB. All of these blocks $B_0$ to $B_{m-1}$ have, respectively, an information storage capacity and a format equal to one another. A format of one block is illustrated in FIG. 3.

Figure 3:
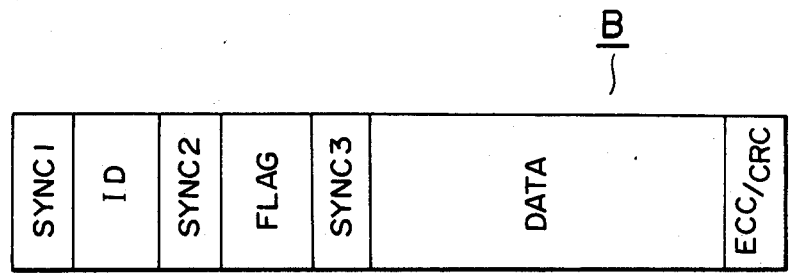
FIG. 3 is a view illustrating a format of one block.

Referring to FIG. 3, a symbol SYNC 1 designates a synchronization mark area recording a VFO (Variable Frequency Oscillator) synchronizing signal for recognizing the leading edge of the block under consideration, a reference symbol ID designates a second identifier area at which a block identifying number has been recorded, a symbol SYNC 2 designates a synchronization mark area at which a VFO synchronizing signal for recognizing the succeeding flag area has been recorded, and a symbol FLAG designates an area for indicating the condition of the block under consideration and stores information as to whether data has been written in or deleted from that block. This area FLAG will be elucidated in more detail later on. Further, a reference symbol SYNC 3 designates a third synchronization mark area were the VFO synchronizing signal for recognizing the leading edge of the succeeding data area has been recorded, a symbol DATA designates an area for storing therein data for the user, and finally a symbol ECC/RC (Error Correcting Code/Cylic Redundancy Check) designates an area for holding error correcting-/detecting information for the user's data.

Figure 4:
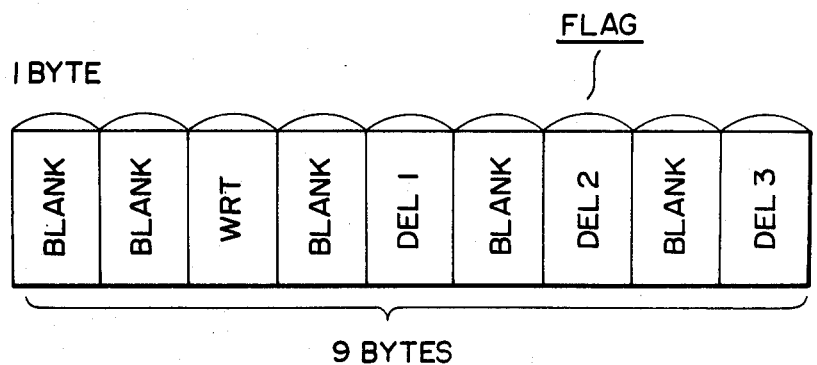
FIG. 4 is a view showing a structure of a flag area in the block.
Figure 5:
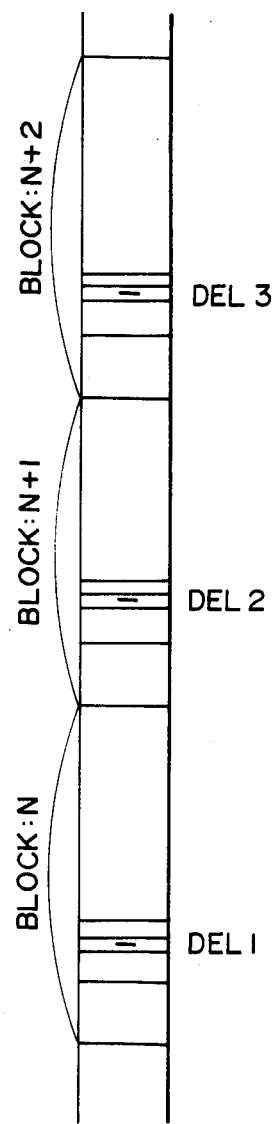
FIG. 5 is a view for illustrating an exemplary embodiment of the invention in which a triplet of deletion flags are employed.

FIG. 4 illustrates in detail a configuration of the area FLAG. In the case of the illustrated embodiment of the invention, the flag area FLAG has a 9-byte length and is divided into 9 sub-areas each of one byte. Among the nine sub-areas illustrated in FIG. 4, those which are of significance as information are four sub-areas, i.e. WRT, DEL 1, DEL 2 and DEL 3. The sub-area WRT indicates whether or not data has been written in the block under consideration in which the sub-area WRT exists. The sub-area DEL 1 indicates whether or not the block under consideration has been logically deleted. The sub-area DEL 2 indicates whether the block which immediately precedes the block under consideration is logically deleted or not. The sub-area DEL 3 indicates whether the block which precedes the block under consideration by two blocks is logically deleted or not. This means from another standpoint that the sate of a given block being deleted or not is controlled or supervised by the flag area FLAG of that given block and additionally by the flag areas of the two succeeding blocks, as will be seen in FIG. 5. In other words, every block is controlled or managed at three discrete areas or locations as to whether it is logically deleted or not. In this way, redundancy can be imparted to the information indicative of the deleted or non-deleted state of any given block.

Figure 6:
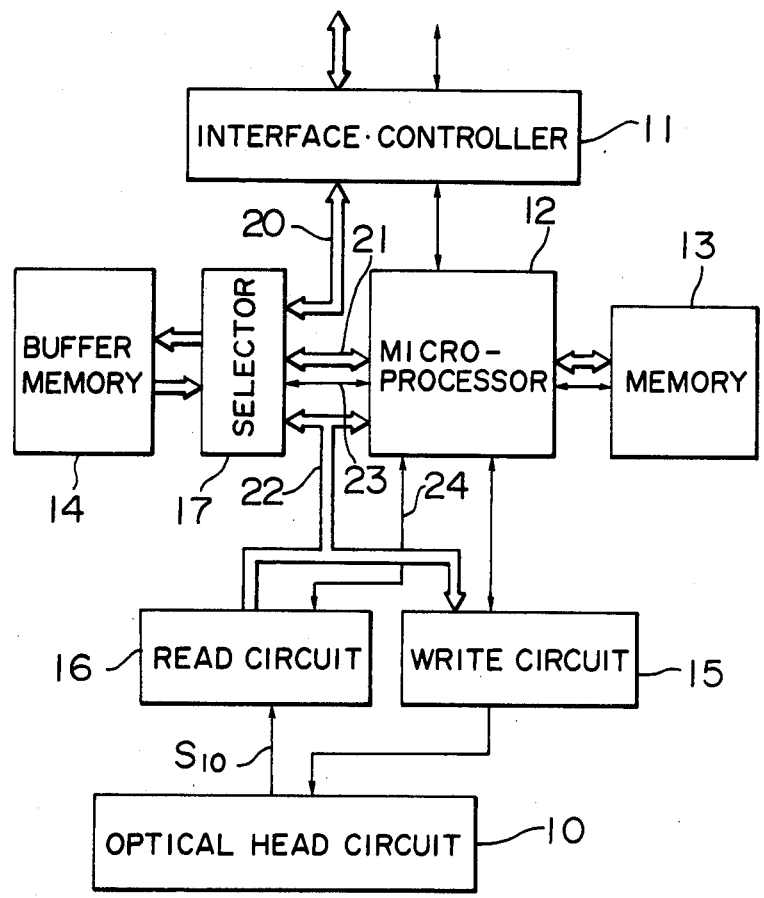
FIG. 6 is a block diagram showing an arrangement of an optical disc type storage equipment for carrying out the invention.

FIG. 6 shows a general arrangement of an optical disc storage system which allows access to be made to the recording medium of the structure described above.

Referring to FIG. 6, a reference numeral 11 denotes an interface controller for controlling data transmission to or reception from a host or high-rank system (CPU channel), a numeral 12 denotes a microprocessor for operating the individual components of the the optical disc control system through predetermined procedures in accordance with commands issued by the host or high-rank system, a numeral 13 denotes a memory for storing therein microcommands for commanding the control operations performed by the microprocessor 12, numeral 14 denotes a buffer memory having a capacity which corresponds at least to the amount of data of one track of the optical disc, a numeral 15 denotes a write circuit for modulating or coding the data outputted from the buffer memory 14 and subsequently supplying the modulated or coded data to an optical head circuit 10, and a numeral 16 denotes a read circuit for demodulating or decoding the output signal S10 from the optical head circuit 10 and transferring the decoded signal to the buffer memory 14. Further, a numeral 17 denotes a selector for selectively connecting an input/output bus to the buffer memory 14. More specifically, the selector 17 serves to select an interface bus 20, a processor bus 21 or a R/W (read/write) circuit bus 22 to be connected to the buffer memory 14 in accordance with the micro-command supplied from the micro-processor 12. In FIG. 6, a driving mechanism for driving the optical disc is omitted from illustration.

As will be seen in FIG. 6, the buffer memory 14 necessarily intervenes in both the process for writing data fed from the upper-rank system on the optical disc and the transfer of data from the optical disc to the upper-rank system. The recording of data in a given block on the optical disc as well as writing of the flag information for deleting a given block is performed by way of the write circuit 15 at a predetermined time upon arrival of the optical head at the block having a designated address which is determined on the basis of the data read from the area ID (FIG. 3) on the optical disc.

Upon reading of the data from the optical disc, that data is stored in the buffer memory 14 to be subsequently checked as to the state of the area FLAG, i.e. whether or not flag information indicates the deletion of data. When the information indicates the deletion, no data transfer is performed to the upper-rank system, but an error event is informed to the upper-rank system to the effect that the logically deleted data has been read out. However, when it is determined that non-deleted data has been read, that data is transferred to the upper-rank system. In this connection, the determination as to the deletion or non-deletion is made through decision by majority on the basis of the states of DEL 1, DEL 2 and DEL 3 read out from each of the three blocks difering from one another in the case of the example illustrated in FIG. 4.

More specifically, the decision by majority may be conducted in the manner shown in the 27 cases in the following table 1. For example, in the second case in the table 1, the value of the majority is 1 which is designating "deleted". In the sixth case, there is no majority and the state of the device fault is indicated. The processing for deletion of data on the optical disc is performed at the flag area of the block which itself is to be logically deleted and the flag areas of two other succeeding blocks as described hereinbefore.

TABLE I

Decision of deletion erasure/non-deletion of block N

| DEL 1 of Block N | | DEL 2 of Block N + 1 | | DEL 3 of Block N + 2 | | |
|---|---|---|---|---|---|---|
| State of SYNC 2 | DEL 1 | State of SYNC 2 | DEL 2 | State of SYNC 2 | DEL 3 | Results of Decision |
| OK | 1 | OK | 1 | OK | 1 | deleted |
| | | | | OK | 0 | deleted |
| | | | | NG | | deleted |
| | | OK | 0 | OK | 1 | deleted |
| | | | | OK | 0 | not deleted |
| | | | | NG | | *1 |
| | | NG | | OK | 1 | deleted |
| | | | | OK | 0 | *1 |
| | | | | NG | | deleted |
| OK | 0 | OK | 1 | OK | 1 | deleted |
| | | | | OK | 0 | not deleted |
| | | | | NG | | *1 |
| | | OK | 0 | OK | 1 | not deleted |
| | | | | OK | 0 | not deleted |
| | | | | NG | | not deleted |
| | | NG | | OK | 1 | *1 |
| | | | | OK | 0 | not deleted |
| | | | | NG | | not deleted |
| NG | | OK | 1 | OK | 1 | deleted |
| | | | | OK | 0 | *1 |
| | | | | NG | | deleted |
| | | OK | 0 | OK | 1 | *1 |
| | | | | OK | 0 | not deleted |
| | | | | NG | | not deleted |
| | | NG | | OK | 1 | deleted |
| | | | | OK | 0 | not deleted |
| | | | | NG | | *1 |

NOTE
OK: SYNC 2 is synchronized with VFO
NG: SYNC 2 is not synchronized with VFO
*1: Error information indicative of device fault In the case of the exemplary embodiment described above, the deletion flag indicative of whether a given block is deleted or not is controlled or monitored with the aid of the flag areas FLAG of the three blocks, i.e. the given block and two other succeeding blocks. However, it should be noted that this feature is not indispensable to the essence of the invention. The deletion flag may be controlled by using the flags of two blocks i.e. the given block and the succeeding one or alternatively by using the flag of other bodies. Further, in the case of the illustrated embodiment, three flag areas are utilized for one block. It will however be understood that when five, seven or more flag areas FLAG are used, the reliability of the deletion flag is correspondingly increased. On the other hand, when a recording medium having a high reliability is used, the number of the flag areas may be reduced down to one.

Although the flag area is provided immediately preceding the data area in the case of the illustated embodiment, it is conceivable that the flag area is provided immediately succeeding the data area or at a location displaced from the data area by several blocks. However, in the latter case, there may arise a possibility of the access speed being lowered. Further, in the case of the illustrated embodiment, the deletion flag of any one of the blocks is controlled or checked by making use of its own flag area and these of two other succeeding blocks. In this connection, it will be appreciated that there exists no need for deletion of the alternative blocks $B_{m-3}$, $B_{m-2}$ and $B_{m-1}$. Accordingly, the deletion flag of the last ordinary block of each track is controlled by its own flag area and the other two flag areas of two of the alternative blocks $B_{m-3}$, $B_{m-2}$ and $B_{m-1}$. Thus, the deletion flag is prevented from straddling the adjacent tracks.

As will be appreciated from the foregoing description, the inventive feature that the deletion flag is dispersed among a plurality of blocks, say three blocks, information about deletion of the block is available with significantly improved reliability. Considering the reliability of the deletion flag, there are five possible occurrences, that is, two occurrences of successful write and failed write in connection with the writing of the deletion flag and three occurrences of the failed reading, the successful reading of the presence of the flag and the successful reading of the absence of the flag in connection with the reading of the deletion flag. When the probability of failed writing is represented by $q'$ that of failed reading by $q$, the probability of the presence of a flag or the set flag being read as the absence thereof being represented by $p_1$, and the probability of the absence of the flag being read as the presence thereof being represented by $p_0$, the reliability of the available deleted state informatin can be arithmetically determined as follows:

(i) In the case where a single flag area is used, the probability of the block which must have been deleted being determined not to be deleted is $q' + (1 - q')(q + p_1)$.

(ii) In the case where three flag areas are used, the probability that the block which must have been deleted is determined not to be deleted is $W_{30} \times E_{30} + W_{21} \times E_{21} + W_{12} \times E_{12} + W_{03} \times E_{03} + W_{30} \times G_{30} + W_{21} \times G_{21} + W_{12} \times G_{12} + W_{03} \times G_{03}$, where $W_{30} = (1 - q')^3$ $W_{21} = 3q'(1 - q')^2$ $W_{12} = 3q'^2(1 - q')$ $W_{03} = q'^3$ $E_{30} = 3P_1^2 - 3P_1^3 + 3P_1 q$ $E_{21} = P_0 P_1^2 + 2(1 - P_0 - q)(1 - P_1 - q)P_1 + (1 - P_0 - q)(P_1 + q)^2 + P_1^2 q + 2P_1 q^2$ $E_{12} = 2(1 - P_0 - q)P_0 P_1 + (1 - P_0 - q)^2 + 2(1 - P_0 - q)P_1 q + 2(1 - P_0 - q)q^2 + P_1 q^2$ $E_{03} = 3P_0(1 - P_0 - q)^2 + (1 - P_0 - q)^3 + 3q(1 - P_0 - q)^2 + 3q^2(1 - P_0 - q)$ $G_{30} = 6P_1 q(1 - P_1 - q) + i\, q^3$ $G_{21} = q^3 + 2(1 - P_1 - q)(q - P_0 q + P_1 q - q^2) + 2P_0 P_1 q$ $G_{12} = 2(1 - P_1 - q)(1 - P_0 - q)q + 2(1 - P_0 - q)P_0 q30\ 2P_0 P_1 q + q^3$ $G_{03} = 6P_0 q(1 - P_0 - q) + q^3$.

In practical applications, a rough estimation has shown that the reliability of the deletion flag is given by $1 \times 10^{-5}$ in terms of the probability of the block which should have been deleteted being determined not to have been deleted in the case where the flag is set at a single area. However, when the flag is dispersed among three blocks, the reliability of the deletion flag is given by $5.5 \times 10^{-10}$ in probability of a misinterpretation occurring.

What is claimed is:

1. A data recording/reproducing system connected to a high-rank system and using a recording medium of rotation type having a plurality of tracks, each of said tracks being divided into a plurality of blocks, and each of said blocks having an address assigned thereto, each of said blocks comprising:

a first area for recording data;

a second area for recording information indicating the validity of said data recorded in said first area; and at least one third area for recording information indicative of the validity of said data recorded in said first area of an other block of said recording medium;

said data recording/reproducing apparatus including means for reading information recorded in said second area of one block indicating the validity of said data recorded in said one block and for reading information recorded in said third area of at least one other block and for determining in accordance with said read-out information from said one block and from said at least one other block whether to transmit said data of said first area of said one block to said high-rank system or not.

2. A data recording/reproducing system according to claim 1, wherein said reading/determining means determines said transmission of said data recorded in said first area of said one block in accordance with the majority of coincidence of the read-out information recorded in said second area of said one block and said third area of said other blocks.

3. A data recording/reproducing system according to claim 3, wherein a plurality of other blocks record information in said third area thereof indicative of said information recorded in said second area of said one block.

4. A data recording/reproducing system according to claim 1, wherein said third area of said one block records information indicative of the validity of said data recorded in an other block preceding said one block.

5. A data recording/reproducing system according to claim 1, wherein said information recording validity of said first area of said one block is recorded in a plurality of said other blocks, and said reading/determining means reads out validity information from said second area of said one block and from said third area of said plurality of other blocks succeeding said one block to determine whether to transmit said data recorded in said first area of said one block to said high-rank system.

6. A data recording/reproducing method wherein a data recording/reproducing system is connected to a high-rank system and utilizes a recording medium of rotation type having a plurality of tracks, each of the tracks being divided into a plurality of blocks, and each of the blocks having an address assigned thereto, the method comprising the steps of:

providing in each of the blocks a first area for recording data, a second area for recording information indicating the validity of the data recorded in the first area, and at least one third area for recording information indicative of the validity of said data recorded in the first area of an other block of the recording medium;

reading information recorded in the second area of one block indicating validity of the data recorded in the one block and reading information recorded in the third area of at least one other block; and determining in accordance with the information read-out from the second area of the one block and the third area of the at least one other block whether to transmit the data of the first area of the one block to the high-rank system or not.

7. A data recording/reproducing method according to claim 6, wherein the step of determining includes checking the number of coincidences of the read-out information recorded in the second area of the one block and the third areas of at least one other block and based upon the majority of the coincidences determining whether to transmit the data of the first area of the one block to the high-rank system or not.

8. A data recording/reproducing method according to claim 7, wherein a plurality of other blocks record information in the third area thereof indicative of the information recorded in the second area of the one block.

9. A data recording/reproducing method according to claim 6, wherein the third area of said one block records information indicative of the validity of said data recorded in an other block preceding the one block.

10. A data recording/reproducing method according to claim 6, wherein the information recording validity of the first area of the one block is recorded in a plurality of the other blocks, the step of reading including reading out the validity information from the second area of the one block and from the third area of the plurality of other blocks succeeding the one block to enable determination of whether or not to transmit the data recorded in the first area of the one block to the high-rank system.

* * * * *